US008823701B2

(12) United States Patent
Aldridge et al.

(10) Patent No.: US 8,823,701 B2
(45) Date of Patent: Sep. 2, 2014

(54) APPARATUS AND METHOD FOR IMPROVED PRESENTATION OF OBJECTS IN A DISTRIBUTED INTERACTIVE SIMULATION

(75) Inventors: David Scott Aldridge, Kirkland, WA (US); Luke Wilson Timmins, Sammamish, WA (US); Christopher Charles John Butcher, Seattle, WA (US)

(73) Assignee: Bungie, Inc., Bellevue, WA (US)

( * ) Notice: Subject to any disclaimer, the term of this patent is extended or adjusted under 35 U.S.C. 154(b) by 305 days.

(21) Appl. No.: 13/463,764

(22) Filed: May 3, 2012

(65) Prior Publication Data

US 2013/0120364 A1 May 16, 2013

Related U.S. Application Data

(60) Provisional application No. 61/482,162, filed on May 3, 2011.

(51) Int. Cl.
*G06T 15/00* (2011.01)
*A63F 13/12* (2006.01)

(52) U.S. Cl.
CPC ........... *G06T 15/00* (2013.01); *A63F 2300/534* (2013.01); *A63F 2300/408* (2013.01); *A63F 2300/5533* (2013.01); *A63F 2300/407* (2013.01); *A63F 13/12* (2013.01)
USPC ........................................................ 345/419

(58) Field of Classification Search
CPC ................... H01L 31/022408; H01L 31/0232; H01L 31/103; H01L 31/105
See application file for complete search history.

(56) References Cited

U.S. PATENT DOCUMENTS

| 5,974,442 | A | 10/1999 | Adams |
| 6,042,477 | A | 3/2000 | Addink |
| 2007/0078003 | A1 | 4/2007 | Sato et al. |
| 2007/0167231 | A1* | 7/2007 | Kim ................................ 463/30 |
| 2008/0096667 | A1 | 4/2008 | Konuma |

OTHER PUBLICATIONS

Australian Examination Report for Australian Patent Application No. 2012250680, issued May 9, 2014.

* cited by examiner

*Primary Examiner* — Kee M Tung
*Assistant Examiner* — Frank Chen
(74) *Attorney, Agent, or Firm* — Davis Wright Tremaine LLP; George C. Rondeau, Jr.; Heather M. Colburn

(57) ABSTRACT

Systems and methods for substantially contemporaneously presenting a distributed simulation at multiple computing devices. A first computing device controls an object in the simulation. A second computing device generates a visual representation of the object associated with a visual status. The second computing device generates a predicted status and receives an update including new status from the first computing device. A portion of the predicted status is set equal to a portion of the new status, and a discrepancy between the predicted and visual statuses is determined. When the discrepancy is greater than a first threshold, at least one velocity of the predicted status may be modified. When the discrepancy is greater than a second threshold, the visual status is modified based at least in part on the predicted status. A new visual representation of the object is rendered based at least in part on the visual status, and displayed.

39 Claims, 7 Drawing Sheets

APPARATUS AND METHOD FOR IMPROVED PRESENTATION OF OBJECTS IN A DISTRIBUTED INTERACTIVE SIMULATION

CROSS REFERENCE TO RELATED APPLICATION(S)

This application claims the benefit of U.S. Provisional Application No. 61/482,162, filed May 3, 2011, which is incorporated herein by reference in its entirety.

BACKGROUND OF THE INVENTION

1. Field of the Invention

The present invention is directed generally to distributed interactive simulations, such as those employed in military simulators and multi-player computer games that present a coherent virtual world across a plurality of operator/player stations.

2. Description of the Related Art

Distributed interactive simulation is a popular form for present-day video games, but has origins in military simulations such as SIMNET in the 1980's and 1990's. In distributed interactive simulations, a virtual world is created and shared among a plurality of computer stations, each supporting at least one user with controls and at least one display.

In some simulations, stations share a distributed clock providing a common timebase for each, for example the well-known Network Time Protocol ("NTP"). However, this is not required. The distributed simulation progresses, generally (but not necessarily) periodically (e.g., 30 updates per second), and generally (though not necessarily) at the same rate at each station (e.g., other stations might run at 60 updates per second).

The stations also share a model of the environment, including airspace and terrain. The terrain may be static, including landforms, buildings (which may include interiors), and bodies of water. Alternatively, the terrain may be non-static: e.g., some or all buildings may be damaged, landforms may be "scarred" (e.g., with tire tracks, craters, or burn marks), and the like. Within this environment, simulated dynamic objects are placed including, for example, vehicles, people, animals. Animation of these dynamic objects gives the appearance of life to the simulation.

In such simulations, each station bears primary responsibility for managing one or more simulated objects. For each object managed by a station, a detailed model is computed for each local time increment to determine its behavior. For example, the detailed model for an all-terrain vehicle ("ATV") might accept steering and pedal input from an operator (generally one local to the managing station). The detailed model of the ATV might carry out computations to simulate an automatic transmission, the interaction of the ATV's suspension system with the terrain, traction between the tires and the terrain surface, and perhaps fuel consumption, engine overheating, or other details and modeled failures. Generally, while crucial for adequate realism, in exchange for efficiency, modeling at this level of detail need only be computed by the managing station, with the results from the detailed model being published to the other stations in the distributed interactive simulation.

Note that the operator of the ATV might be a human player, or the operator can be an artificial intelligence program ("AI") simulating an ally or enemy where another human player is not available or required. When used, an AI is effectively just a further component of the detailed model; the managing station maintains the status and performs the incremental simulation required by the ATV-driving AI, but the remote stations only receive the results.

In some cases, objects being simulated may be complex and articulated (as with human, animal, or alien figures) requiring complex animation by a kinematic model, but others objects may be relatively simple (e.g., a crate or projectile), in which case a simpler ballistics model may be used.

However, there are issues with sharing the results of the detailed modeling, also called updates, from the managing station. For example, it takes time to distribute the updates to the remote stations that do not control the object; and because of this latency, an update to a model is always somewhat "old" information. In a simulation where a distributed simulation clock is correctly set at all stations, any update will be timestamped at some simulation time in the past, though generally recent. However, a rigid time keeping system can introduce resonances into the models that result in visual artifacts. Additionally, maintaining accurate clocks is sometimes a source of unnecessary complexity, and occasionally, error. Further, over an unreliable network, updates may be lost or delayed and arrive with irregular latency. Additionally, bandwidth constraints and the number of objects in a simulation may limit the number of updates that can be sent for each object, such that updates are not provided to remote stations as often as the managing station computes the detailed simulation.

At each station, the display presents the virtual world to the player. The display is generally refreshed more often than updates arrive for remotely managed objects, yet to only change the display of remotely managed objects as often as updates arrive would make the remotely managed objects appear jerky and unrealistic. To alleviate this, objects updates are associated with the time to which they correspond and the recipient of the updates can extrapolate how to display the object at times after the update.

To achieve this, the update must represent the state of the object at a particular time. The state may include, for example, the position and orientation of the object (generally, though not necessarily, including six coordinate axes: X, Y, Z, roll, pitch, and yaw), and other properties that have different values (e.g., whether the headlights are on, whether a vehicle's engine is smoking, the time at which a live grenade will detonate). The particular time corresponds to when the state was current.

Exactly what an object's state includes depends on the nature of the object. For complex articulated objects, e.g., an animal, the state may include articulations of the object's skeleton, or an index into an animation cycle summarizing such articulations.

In some cases, an object may have multiple modes of operation, e.g., when an "animal" object is alive, it may be driven by an animation cycle, but when the animal dies, as in a hunting simulation, the mode of operation of the articulated body becomes an relaxed kinematic model. For example, the body goes limp, though the limitations imposed by the skeleton remain in control. For those objects having multiple modes of control, the state may further include an identification of which mode of control is being used.

Herein, "state" may include many properties other than just physical position, orientation (rotation). Some of these, such as the index into an animation cycles, walk cycles, etc. may be usefully extrapolated for prediction. However, some properties, such as whether a vehicle's headlights are on, or the horn honking, are only trivially extrapolated. For example, once the lights are on, they remain on until an update says they turn off.

A state may also include information useful for extrapolating subsequent states with improved accuracy, for example velocities on linear or rotational axes, and accelerations on linear or rotational axes. While an extrapolation can be made without such hints, for example by deriving velocity as the difference in position over the last two updates divided by the difference in time of the last two updates, to provide explicit velocities or accelerations can improve the results.

Herein, "status" may include state information, and/or one or more calculation results obtained with respect to state.

For each iteration of the simulation for an object managed at a station, a new state results from operator inputs and detailed model execution, including velocity and/or acceleration values, if provided for any of the various degrees of freedom in the object.

However, the state of an object is sent from the managing station to each of the other stations less often than once per iteration. For example, if a managing station were to update a model of an object thirty times per second, updates might only be sent to other stations five times per second, or even less frequently (e.g., twice a second) if the object is unimportant, far away, exceptionally consistent, or only slowly changing, or if there are many objects to be updated and/or communications bandwidth is highly constrained.

Based on updates received from the managing station, extrapolation techniques provide the best available information concerning the status of a remotely managed object, and the best available information for predicting its movements (at least, for the immediate future). Still, jarring discontinuities in the apparent motion can occur when extrapolated states have substantially overshot or undershot the state described in a subsequent update. Often this comes because an operator has made a sudden turn, jammed on the brakes, dodged or swerved to avoid a collision, etc. that extrapolation from an earlier update does not anticipate.

In simulation parlance, providing the best estimate of the object's current state is the job of a "predictor," and it is the job of a "corrector" to hide the apparent discontinuity of the extrapolated states in a way that is as aesthetically pleasing as possible.

Unfortunately, the predictor-corrector systems applied to date fall short of an aesthetically appealing, seemingly realistic behavior for a wide assortment of object types, or for the same object type, but under a wide variety of conditions. The result is unpredictably jerky motion or behavior of a remotely managed object. This can make targeting difficult and frustrating, for simulations where aiming at and shooting objects are key objectives. Similarly, it can make following remotely managed objects difficult and frustrating in a driving or flying simulation. Accordingly, there is a need for a better way of presenting the movements of a remotely managed object in a distributed interactive simulation. The present application provides this and other advantages as will be apparent from the following detailed description and accompanying figures.

SUMMARY OF THE INVENTION

Embodiments include a method for substantially contemporaneously presenting a distributed simulation at a plurality of computing devices. The plurality of computing devices includes a first computing device executing a first portion of the distributed simulation. The first portion controls an object. The plurality of computing devices includes a second computing device that executes a second portion of the distributed simulation. The second portion generates a first visual representation of the object displayable on a first display device. The second computing device includes a visual status associated with the object and the first visual representation. The visual status includes at least one parameter value. The second computing device received a previous update from the first computing device including a previous status associated with a second visual representation of the object. The second computing device generates a predicted status of the object based at least in part on the previous status. The predicted status includes at least one velocity and at least one parameter value. The second computing device receives an update including a new status associated with a third visual representation of the object from the first computing device. The new status includes at least one parameter value. The second computing device sets the at least one parameter value of the predicted status equal to the at least one parameter value of the new status, and determines a discrepancy between the at least one parameter value of the predicted status and the at least one parameter value of the visual status. When the discrepancy is greater than a first threshold value, the second computing device modifies the at least one velocity of the predicted status. When the discrepancy is greater than a second threshold value, the second computing device modifies at least one parameter value of the visual status based at least in part on the at least one parameter value of the predicted status. The second computing device renders a fourth visual representation of the object based at least in part on the visual status and displays the fourth visual representation of the object on the first display device.

The third visual representation of the object may be displayed by the first computing device on a second display device, and the fourth visual representation of the object displayed by the second computing device on the first display device substantially contemporaneously with the third visual representation of the object displayed by the first computing device on the second display device.

In some embodiments, the predicted status is a first predicted status, and the discrepancy is a first discrepancy. In such embodiments, the second computing device may generate a second predicted status (including at least one parameter value) based at least in part on the at least one velocity of the predicted status. When the second discrepancy is greater than the second threshold value, the second computing device may modify the at least one parameter value of the visual status based at least in part on the at least one parameter value of the second predicted status. In such embodiments, the second computing device renders a fifth visual representation of the object based at least in part on the visual status, and displays the fifth visual representation of the object on the first display device.

The second computing device may obtain the first threshold value from a storage device accessible by the second computing device. The object may have a type, and the first threshold value may stored in a table stored on the storage device. In such embodiments, the first threshold value is associated with the type of the object in the table. In some embodiments, the at least one parameter value of the new status includes at least one velocity, and modifying the at least one velocity of the predicted status includes obtaining a bump value associated with the type of the object, and calculating the at least one velocity of the predicted status as a function of the bump value, the discrepancy, and the at least one velocity of the new status.

In some embodiments, the at least one parameter value of the visual status includes at least one velocity, and the at least one parameter value of the predicted status includes at least one velocity. In such embodiments, determining the discrepancy between the at least one parameter value of the predicted status and the at least one parameter value of the visual status may include determining a discrepancy between the at least one velocity of the predicted status and the at least one velocity of the visual status. When the at least one parameter value of the new status includes at least one velocity, the at least one velocity of the predicted status may be set equal to the at least one velocity of the new status.

In some embodiments, modifying the at least one parameter value of the visual status based at least in part on the at least one parameter value of the predicted status when the discrepancy is greater than the second threshold value includes determining whether the discrepancy is greater than a third threshold value that is larger than the second threshold value. When it is determined that the discrepancy is greater than the third threshold value, the second computing device may set the at least one parameter value of the visual status equal to the at least one parameter value of the predicted status. The second computing device may determine a blended status when the discrepancy is less than the third threshold value. The blended status may be based at least in part on the at least one parameter value of the visual status and the at least one parameter value of the predicted status. The blended status may include at least one parameter value, and the at least one parameter value of the visual status may be set equal to the at least one parameter value of the blended status.

In some embodiments, the at least one parameter value of the visual status includes at least one of position information and orientation information, and the at least one parameter value of the predicted status includes at least one of position information and orientation information. In such embodiments, determining the discrepancy between the at least one parameter value of the predicted status and the at least one parameter value of the visual status may include determining a discrepancy between the at least one of position information and orientation information of the predicted status and the at least one of position information and orientation information of the visual status. When the at least one parameter value of the new status includes at least one of position information and orientation information, the at least one of position information and orientation information of the predicted status may be set equal to the at least one of position information and orientation information of the new status.

Modifying the at least one parameter value of the visual status based at least in part on the at least one parameter value of the predicted status when the discrepancy is greater than the second threshold value may include determining whether the discrepancy is greater than a third threshold value, wherein the third threshold value is larger than the second threshold value. When it is determined that the discrepancy is greater than the third threshold value, the at least one of position information and orientation information of the visual status may be set equal to the at least one of position information and orientation information of the predicted status.

The object may have a type and the third threshold value may be stored in a table and associated with the object type in the table. The second computing device may obtain the third threshold value from the table.

Modifying the at least one parameter value of the visual status based at least in part on the at least one parameter value of the predicted status when the discrepancy is greater than the second threshold value may include determining a blended status when the discrepancy is less than the third threshold value. The blended status may be based at least in part on the at least one of position information and orientation information of the visual status and the at least one of position information and orientation information of the predicted status. In such embodiments, the blended status includes at least one of position information and orientation information.

After the blended status is determined, the at least one of position information and orientation information of the visual status may be set equal to the at least one of position information and orientation information of the blended status.

The blend status may be determined at least in part based upon one or more parameter values associated with the type of the object in embodiments in which the object has a type. The second and third threshold values may be stored in a table and associated with the object type in the table. In such embodiments, the second computing device, may obtain the second and third threshold values from the table.

The at least one parameter value of the new status may include a mode of control of the object, and the second computing device may select at least one of the second and third threshold values from a plurality of first and second threshold values based at least in part on the mode of control of the object. The section(s) may also be based at least in part on the type of the object.

Modifying the at least one parameter value of the visual status based at least in part on the at least one parameter value of the predicted status when the discrepancy is greater than the second threshold value may include determining a local collision status, and modifying the visual status based on the local collision status. If the distributed simulation includes terrain, the second computing device may repeat determining the local collision status and modifying the visual status based on the local collision status until the object does not substantially interpenetrate the terrain.

The portion of the distributed simulation executing on the first computing device may control a portion of the plurality of objects and send updates related to at least one object of the portion of the plurality of objects to the second computing device. In such embodiments, the second computing device receives, from the first computing device, a previous update including status information related to a first object of the portion of the plurality of objects controlled by the first computing device. The second computing device generates and displays a first visual representation of the first object based at least in part on the status information related to the first object. The second computing device includes visual status information associated with the first object and the first visual representation. The second computing device receives a new update including status information from the first computing device, the new update having been received after the previous update. The second computing device determines predicted status information for the first object based at least in part on the status information of the previous update. The predicted status information includes at least one velocity value. The second computing device determines whether the status information of the new update is related to the first object. When the status information of the new update is related to the first object, the second computing device sets at least a portion of the predicted status information equal to at least a portion of the status information of the new update. The second computing device determines a discrepancy between the visual status information and the predicted status information. When the discrepancy is greater than a first threshold value, the second computing device modifies the at least one velocity value of the predicted status information, and when the discrepancy is greater than a second threshold value, the second computing device modifies the visual status information based at least in part on the predicted status information. The second computing device renders a second visual representation of the object based at least in part on the visual status information, and displays the second visual representation of the object on the display device.

In some embodiments, the predicted status information is a first predicted status information, and the discrepancy is a first discrepancy. In such embodiments, the second computing device generates second predicted status information based at least in part on the at least one velocity of the first predicted status information, and determines a second discrepancy between the visual status information and the second predicted status information. When the second discrepancy is greater than the second threshold value, the second computing device modifies the visual status information based at least in part on the second predicted status information. The second computing device renders a third visual representation of the object based at least in part on the visual status information, and displays the third visual representation of the object on the display device.

In some embodiments, the portion of the distributed simulation executing on the second computing device controls a second portion of the plurality of objects. In such embodiments, the second computing device sends updates related to at least one object of the second portion of the plurality of objects to the first computing device. The second computing device may receive user input via a user interface device, that changes a status of a selected object of the second portion of the plurality of objects. The second computing device may create an update including status information related to the selected object, and send the update related to the selected object to the first computing device. In some embodiments, a server is connected to the plurality of computing devices over the network. In such embodiments, the second computing device may send updates related to at least one object of the second portion of the plurality of objects to the server for forwarding thereby to others of the plurality of computing devices.

Some embodiments include a method in which the second computing device receives a previous update from the first computing device. The previous update includes status information related to a first object of the portion of the plurality of objects controlled by the first computing device. The second computing device generates and displays a first visual representation of the first object based at least in part on the status information related to the first object. Visual status information is associated with the first object and the first visual representation. The second computing device receives a new update from the first computing device after the previous update. The new update includes status information. The second computing device determines predicted status information for the first object based at least in part on the status information of the previous update. The second computing device determines whether the status information of the new update is related to the first object, and when the status information of the new update is related to the first object, the second computing device sets at least a portion of the predicted status information equal to at least a portion of the status information of the new update. The second computing device determines a discrepancy between the visual status information and the predicted status information. When the discrepancy is greater than a first threshold value, the second computing device sets at least a portion of the visual status information equal to at least a portion of the predicted status information. When the discrepancy is less than the first threshold value and greater than the second threshold value, the second computing device determines blended status information based at least in part on the visual status information and the predicted status information, and sets at least a portion of the visual status information equal to at least a portion of the blended status information. The first threshold value is greater than the second threshold value. The second computing device renders a second visual representation of the first object based at least in part on the visual status information; and displays the second visual representation of the first object on the display device.

Some embodiments include a method for use with a plurality of computing devices connected to one another over a network and each executing a portion of a distributed simulation including a plurality of objects. The portion executing on a first of the plurality of computing devices controlling a first portion of the plurality of objects and sending updates related to at least one object of the first portion of the plurality of objects to a second of the plurality of computing devices. The portion executing on the second computing device controlling a second portion of the plurality of objects and sending updates related to at least one object of the second portion of the plurality of objects to the first computing device. The second computing device renders a first visual representation of a first object of the first portion of the plurality of objects, and a first visual representation of a second object of the second portion of the plurality of objects. The first visual representation of the first object is associated with visual status information. The second computing device receives input, via a user input device, changing the first visual representation of the second object, and occasionally receives updates from the first computing device usable by the second computing device to modify the first visual representation of the first object. Each of the updates received from the first computing device includes status information related to the first object. As the first visual representation of the second object changes, the second computing device occasionally sends updates to the first computing device over the network. The updates include status information related to the second object usable by the first computing device to modify a second visual representation of the second object. The second computing device occasionally generates predicted status information for the first object including at least one velocity. After each of the updates is received at the second computing device, the second computing device sets the predicted status information equal to the status information of the update. The second computing device determines a discrepancy between the predicted status information and the visual status information associated with the first visual representation of the first object. When the discrepancy is larger than a first threshold value, the second computing device updates the predicted status information by changing the at least one velocity. When the discrepancy is larger than a second threshold value, the second computing device modifies the visual status information associated with the first visual representation of the first object based at least in part on the predicted status information. The second computing device re-renders the first visual representation of the second object based at least in part on the visual status information.

The first object may have a type, and the first and second threshold values may be stored in a table and associated with the type of the object in the table. In such embodiments, the second computing device may look up the first and second threshold values in the table.

Modifying the visual status information associated with the first visual representation of the first object based at least in part on the predicted status information when the discrepancy is larger than the second threshold value may include setting the visual status information equal to the predicted status information when the discrepancy is greater than a third threshold value. On the other hand, when the discrepancy is less than the third threshold value and greater than the second threshold value, the second computing device may determine blended status information based at least in part on the visual status information and the predicted status information, and set the visual status information equal to the blended status information. In such embodiments, the third threshold value is greater than the second threshold value.

Embodiments include one or more computer readable media storing computer executable instructions that when executed by one or more processors perform one or more of the methods described above. For example, one or more computer readable media storing computer executable instructions that when executed by one or more processors perform a method for use with a first computing device executing a first portion of a distributed simulation, the first portion controlling an object. The method including executing a second portion of the distributed simulation, the second portion generating a first visual representation of the object displayable on a first display device. A visual status being associated with the object and the first visual representation. The visual status may include at least one parameter value. The method may further include generating a predicted status of the object based at least in part on a previous status included in a previous update received from the first computing device. The previous status may be associated with a second visual representation of the object. The predicted status including at least one velocity and at least one parameter value. The method may further include receiving an update from the first computing device. The update may include a new status associated with a third visual representation of the object. The new status may include at least one parameter value. The method may further include setting the at least one parameter value of the predicted status equal to the at least one parameter value of the new status, and determining a discrepancy between the at least one parameter value of the predicted status and the at least one parameter value of the visual status. When the discrepancy is greater than a first threshold value, the at least one velocity of the predicted status is modified. When the discrepancy is greater than a second threshold value, at least one parameter value of the visual status is modified based at least in part on the at least one parameter value of the predicted status. The method may further include rendering a fourth visual representation of the object based at least in part on the visual status, and displaying the fourth visual representation of the object on the first display device.

The predicted status may be a first predicted status, and the discrepancy may be a first discrepancy. In such embodiment, the method may further include generating a second predicted status based at least in part on the at least one velocity of the predicted status. The second predicted status including at least one parameter value. When the second discrepancy is greater than a second threshold value, the at least one parameter value of the visual status is modified based at least in part on the at least one parameter value of the second predicted status. The method may further include rendering a fifth visual representation of the object based at least in part on the visual status, and displaying the fifth visual representation of the object on the first display device.

Modifying the at least one parameter value of the visual status based at least in part on the at least one parameter value of the predicted status when the discrepancy is greater than the second threshold value may include determining whether the discrepancy is greater than a third threshold value. The third threshold value is larger than the second threshold value. When it is determined that the discrepancy is greater than the third threshold value, the at least one of parameter value of the visual status is set equal to the at least one of parameter value of the predicted status. On the other hand, when it is determined that the discrepancy is less than the third threshold value, a blended status is determined based at least in part on the at least one parameter value of the visual status and the at least one parameter value of the predicted status. The blended status includes at least one parameter value. The at least one parameter value of the visual status is set equal to the at least one of parameter value of the blended status.

Embodiments include a system for implementing a distributed simulation including a plurality of objects. The system includes a plurality of computing devices connected to one another over a network, each computing device being configured to execute a portion of the distributed simulation. A first computing device of the plurality of computing devices executes a first portion of the distributed simulation that controls a portion of the plurality of objects and sends updates related to at least one object of the portion of the plurality of objects to a second of the plurality of computing devices. The second computing device may be configured to receive from the first computing device a previous update including status information related to a first object of the portion of the plurality of objects controlled by the first computing device. The second computing device may be further configured to generate a first visual representation of the first object based at least in part on the status information related to the first object, and display the first visual representation on a display device. The second computing device has visual status information associated with the first object and the first visual representation. The second computing device may be further configured to receive a new update including status information from the first computing device, the new update having been received after the previous update. The second computing device may be further configured to determine predicted status information for the first object based at least in part on the status information of the previous update, the predicted status information including at least one velocity value. The second computing device may be further configured to determine whether the status information of the new update is related to the first object, and when the status information of the new update is related to the first object, set at least a portion of the predicted status information equal to at least a portion of the status information of the new update. The second computing device may be further configured to determine a discrepancy between the visual status information and the predicted status information. When the discrepancy is greater than a first threshold value, the second computing device may modify the at least one velocity value of the predicted status information. When the discrepancy is greater than a second threshold value, the second computing device may modify the visual status information based at least in part on the predicted status information. The second computing device renders a second visual representation of the object based at least in part on the visual status information, and displays the second visual representation of the object on the display device.

In embodiments in which the predicted status information is a first predicted status information, the discrepancy is a first discrepancy, the second computing device may be further configured to generate second predicted status information based at least in part on the at least one velocity of the first predicted status information, and determine a second discrepancy between the visual status information and the second predicted status information. When the second discrepancy is greater than the second threshold value, the second computing device may modify the visual status information based at least in part on the second predicted status information. the second computing device renders a third visual representation of the object based at least in part on the visual status information, and displays the third visual representation of the object on the display device.

The portion of the distributed simulation executing on the second computing device may control a second portion of the plurality of objects. In such embodiments, the second computing device may be further configured to send updates related to at least one object of the second portion of the plurality of objects to the first computing device. The second computing device may be configured to receive user input via a user interface device, the user input changing a status of a selected object of the second portion of the plurality of objects, create an update including status information related to the selected object, and send the update related to the selected object to the first computing device. They system may include a server connected to the plurality of computing devices over the network. The second computing device may be configured to send updates related to at least one object of the second portion of the plurality of objects to the server for forwarding thereby to others of the plurality of computing devices.

BRIEF DESCRIPTION OF THE SEVERAL VIEWS OF THE DRAWING(S)

The aspects of the present invention will be apparent upon consideration of the following detailed description taken in conjunction with the accompanying drawings, in which like referenced characters refer to like parts throughout, and in which.

DETAILED DESCRIPTION OF THE INVENTION

The context of a computer game is used herein, by way of example and for ease of discussion, when describing a distributed simulation. However, the applicability of the systems and methods described herein are not limited to use with computer games and may be used for other types of distributed simulations. Further, for the embodiments discussed, a distributed clock is not assumed. Instead, high quality predictions based on an ongoing stream of updates having typical latency may be used to produce coherent presentation of the distributed interactive simulation. The results of such assumptions may degrade if the latency varies widely over short interval, but nevertheless may provide a generally consistent, satisfying shared simulation. While the systems and methods described herein may operate with respect to distributed simulations having the same frame rate and update rate at all stations, this is neither a presumption, nor a requirement. Thus, in the embodiments discussed, each consecutive increment to the distributed simulation at each station does not correspond to a particular time or timestamp, other than "now," and updates occurring simultaneously in the real world will appear to occur, after a brief latency, at all participating stations, even though, due to the latencies and limitations discussed above in the Background Section, the effects of updates produced for objects managed by one station might not be seen at some other stations until a few iterations later.

By way of a non-limited overview, updates regarding a remotely controlled, physics-based model of an object of a distributed interactive simulation are accepted. Under predetermined conditions apropos to the object, an impulse or "velocity bump" is determined, scaled, and added to the update to form a current prediction of the simulated object's correct position. Each subsequent iteration of the physics-based simulation provides a new predicted status, until a new update is received. A separate visual model is maintained to alleviate visible discontinuities in the predicted or updated status. However, the visual model continually converges toward the current prediction, with a new status of the visual model being determined from the prior status, its discrepancy from the current prediction, and certain predetermined criteria and parameters apropos to the object being represented. Also tied to the visual model is a collision system for detecting interaction with other objects, especially projectiles. Collectively, these features provide a more aesthetically pleasing visual presentation that appears more realistic, and more correct (e.g., when chasing or targeting simulated vehicles) than prior distributed interactive simulations.

Figure 1:
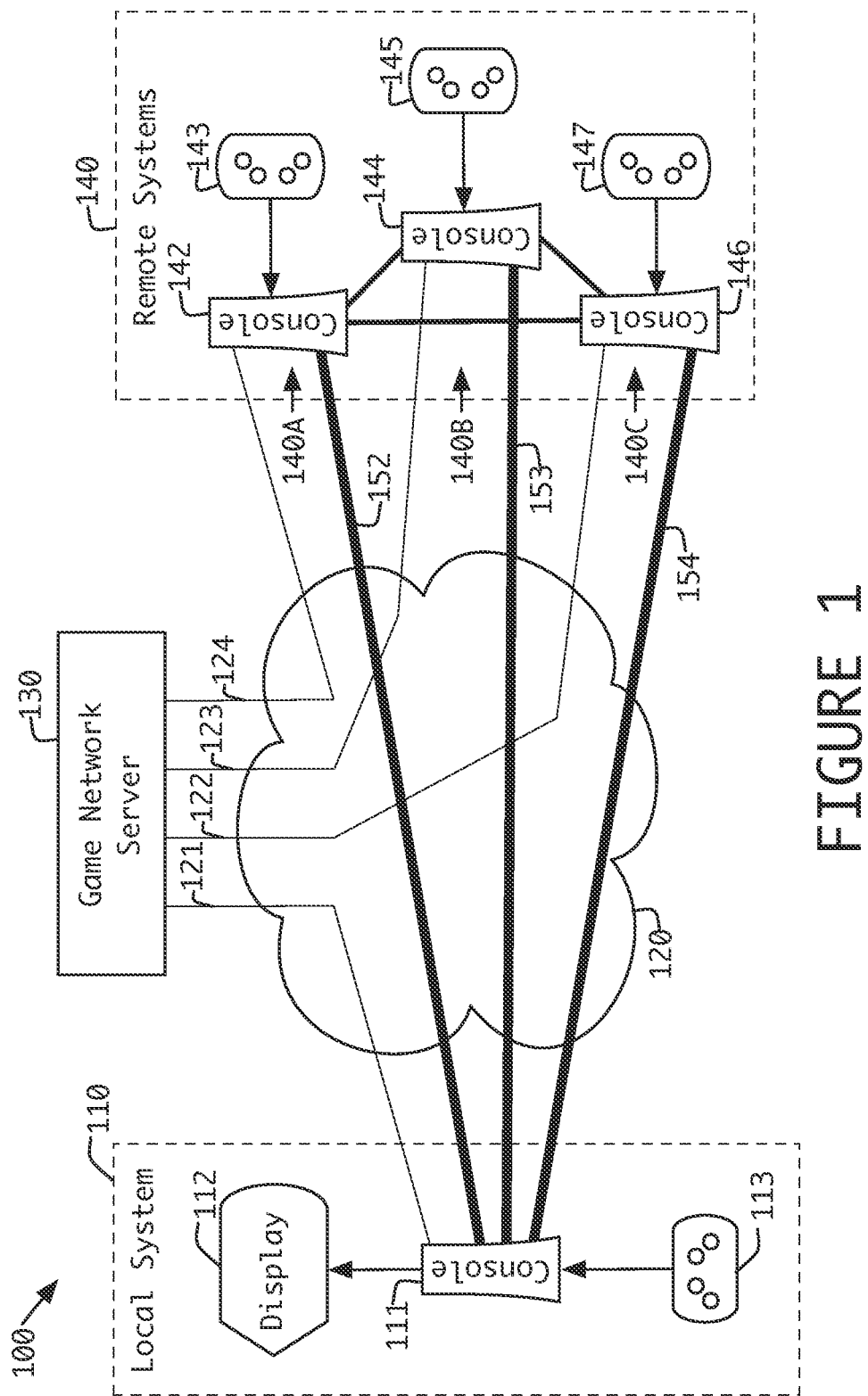
FIG. 1 is a block diagram of a system for distributed interactive simulation.

Referring to FIG. 1, distributed interactive simulation system 100 includes local station 110, designated as the station local to a user (not shown), and multiple remote stations 140, all of which can communicate with server 130 over network 120 (e.g., the Internet). In the embodiment illustrated, remote stations 140 include remote stations 140A, 140B, and 140C. However, this is not a requirement and the remote stations 140 may include any number of remote stations. As explained below, the stations 110, 140A, 140B, and 140C may selectively communicate with one another.

Using the example of a distributed gaming system, server 130 is a game network server, allowing users at each connected station to find each other and arrange and join games.

Each of the stations 110, 140A, 140B, 140C includes a computing device, which may be implemented as a gaming console 111, 142, 144, 146, respectively. By way of a non-limiting example, gaming consoles 111, 142, 144, 146 may each be implemented as an Xbox360, manufactured by Microsoft Corporation of Redmond, Wash. Additionally, each of stations 110, 140A, 140B, 140C includes a controller 113, 143, 145, 147, respectively. Though each of stations 110, 140A, 140B, 140C also includes a display, only display 112 of local station 110 is shown in FIG. 1. Console 111 of local station 110 communicates with server 130, through connection 121. Consoles 142, 144, 146 of remote stations 140 communicate with server 130, through connections 122, 123, 124, respectively.

In some embodiments, console 111 may communicate directly with each of consoles 142, 144, 146, over communication channels 152, 153, 154, respectively, while the consoles 111, 142, 144, 146 are joined together in a distributed interactive simulation, such as a computer game. In other embodiments, server 130 handles communication between stations 110, 140A, 140B, 140C. Such embodiments may be well suited for very large simulations, with many stations because upload bandwidth is commonly more limited than download bandwidth, yet the volume of communications from the local station 110 to each of remote stations 140 is approximately the same as the volume from remote stations 140 to local station 110. By allowing server 130 to effectively "broadcast" updates from local console 111 to each of remote consoles 142, 144, 146, a considerable transmission burden is eased from console 111. However, for the purpose of simplifying further discussion, we will focus on the two consoles 111 and 142 and consider only communication between them, whether or not mediated by server 130. However, as is appreciated by those of ordinary skill in the art, communications between any pair of consoles 111, 142, 144, 146 may operate in a similar manner.

Figure 2:
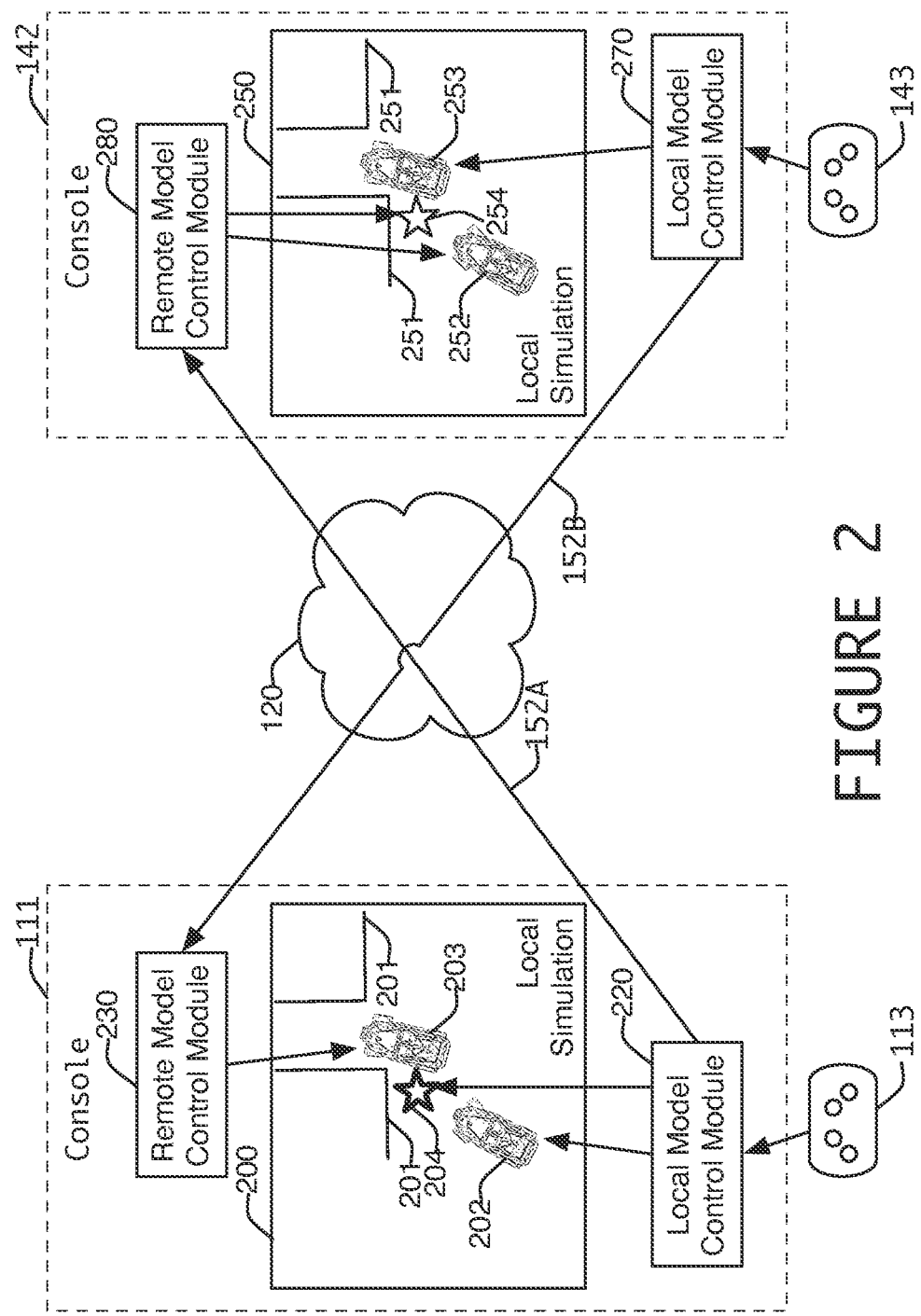
FIG. 2 is a diagram showing local representations of a distributed interactive simulation shared between two stations of the system of FIG. 1.

Thus, in FIG. 2, some of the inner workings of a distributed interactive simulation are shown. Each of consoles 111 and 142 maintains a corresponding local representation of the distributed simulation as data. The local representation maintained on console 111 is illustrated as local simulation 200. The local representation maintained on console 142 is illustrated as local simulation 250. The distributed simulation includes static objects and dynamic objects. Each of the local simulations 200, 250 includes a separate object for each of the static and dynamic objects of the distributed simulation. For example, local simulation 200 includes static objects 201 that correspond to static objects 251 in local simulation 250. Similarly, local simulation 200 includes dynamic objects 202, 203, 204 that correspond to static objects 252, 253, 254, respectively, in local simulation 250.

Each of the consoles 111, 142, 144, 146 is responsible for controlling particular objects. For example, the player at console 111 can use controller 113 to provide input to local model control module 220, controlling dynamic object 202 (e.g., a simulated vehicle). In this example, local model control module 220 also controls dynamic object 204, which may be, for example, a mine, projectile, explosion, box, or other dynamic object. Static objects 201, typically include terrain and often buildings, are static and not controlled by the controller 113. Occasionally (e.g., periodically), local model control module 220 sends an update 152A (e.g., via channel 152) to remote model control module 280 in remote console 142. Remote model control module 280 is responsible for controlling dynamic objects 252 and 254 in local simulation 250, which are the same as dynamic objects 202 and 204 in local simulation 200.

For each of at least a portion of the dynamic objects (e.g., dynamic objects 202 and 204) for which the controller 111 is responsible, each update 152A may include an identification of the dynamic object, type information for the dynamic object, and status information for the identified dynamic object, which may include an indication of mode of operation (e.g., "controlled" or "uncontrolled") of the dynamic object. In some embodiments, such information may be included in one or more updates.

Conversely, local model control module 270 receives input from game controller 143 to manage dynamic object 253 (e.g., another vehicle). Updates 152B sent from local model control module 270 to remote model control module 230 are used to control at least a portion of the dynamic objects in local simulation 200. In this example, updates 152B control object 203 whereby object 253 (e.g., the vehicle "driven" by the user) of console 142 appears at the station 110 with console 111 as object 203.

For each of at least a portion of the dynamic objects (e.g., dynamic object 253) for which the controller 142 is responsible, each update 152B may include an identification of the dynamic object, type information for the dynamic object, and status information for the identified dynamic object, which may include an indication of mode of operation (e.g., "controlled" or "uncontrolled") of the dynamic object. In some embodiments, such information may be included in one or more updates.

Static objects 251 in local simulation 250 correspond to objects 201 in local simulation 200.

Figure 3:
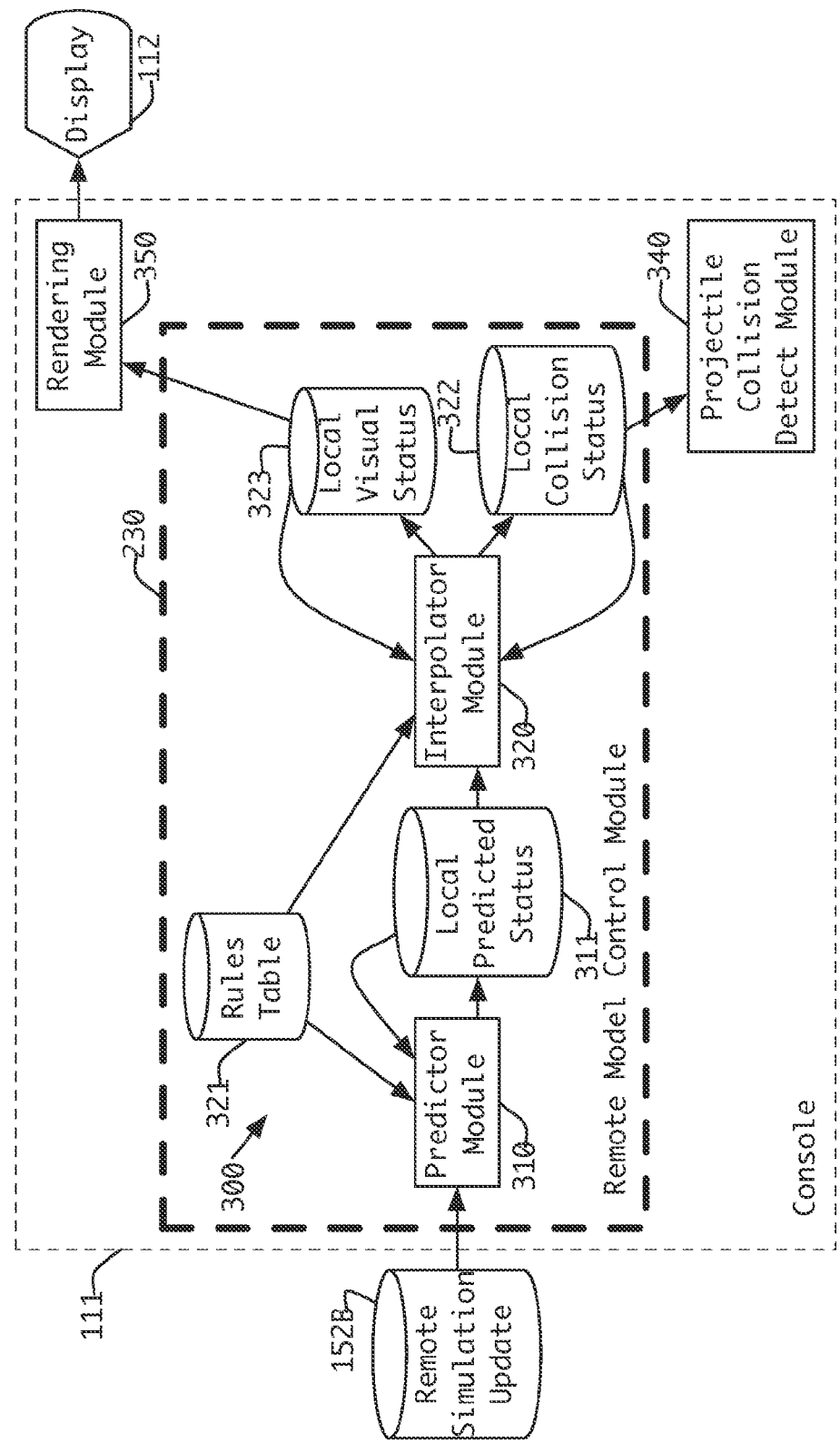
FIG. 3 is block diagram of a portion of a console of the system of FIG. 1 showing the predictor-interpolator modules and their interconnections.

FIG. 3 shows inner workings 300 of remote model control module 230 of console 111, as it receives updates 152B from console 142 at predictor module 310.

Predictor module 310 takes the most recently received update 152B and compares it to predetermined values in rules table 321 corresponding to the object (e.g., dynamic object 203) represented in update 152B. For ease of illustration, the most recently received update represents dynamic object 203. If a sufficient discrepancy exists between the local visual status 323 and most recent remote simulation update, an impulse, or "bump" is determined from the discrepancy and further information in rules table 321 apropos to dynamic object 203 and applied to the physics model of dynamic object 203. This effectively increases certain velocity vectors used to extrapolate the future status of dynamic object 203 in subsequent iterations. This is discussed in more detail below, in conjunction with FIGS. 4, 5A, and 5B. Predictor module 310 runs a detailed physics model for the dynamic object 203, allowing better predictions to be made in subsequent iterations of local simulation 200. The bump applied to the local physics representation of is somewhat analogous to a "sharpening" in image processing, where a discontinuity is enhanced by some amount. In this case, the bump is injected as an impulse into the physics model, and its effect will be observable only in subsequent iterations of local simulation 200. When a new update 152B arrives, the next iteration of local simulation 200 uses the status of remotely managed dynamic object 253 as represented in the new update, and may add a velocity bump to produce a new predicted status 311. In subsequent iterations of local simulation 200, a detailed physics simulation extrapolates from the current predicted status 311 to obtain a new predicted status 311.

However, were the local predicted status 311 to be used directly to drive the display 112, there would likely be a discontinuity in the smooth motions of local predicted status 311 every time a new remote simulation update 152B arrives, since it likely contains information that was not anticipated by the prior update 152B.

To remedy this, interpolator module 320 attempts to move a local visual status 323 in an aesthetically appealing manner toward current local predicted status 311 using rules table 321. The prior value of the local visual status 323 is used as a basis, so that generally, as new updates 152B discontinuously affect the local predicted status 311, the images of the object produced by the rendering module 350 for display 112 show an aesthetically appealing motion, generally with discontinuities disguised. As a result, the visual status 323 is continually converging over time to the current predicted status 311.

The interpolator module 320 also maintains a local collision status 322. However, rather than being rendered for the player to see, the collision volume of the object travels logically with the visual model. This improves the realism of simulated targeting, as with projectile weapons, and vehicular collisions. The "solidness" of objects in the world is appropriate and corresponds to the locations of the objects. For example, an object can be shot where it is seen (as detected with projectile collision detect module 340), or in a complex interpolator module 310, a vehicle that appears to hit an obstacle, damages that obstacle (or is damaged by the obstacle) and may rebound from it, affecting local visual status 323.

The appearance of object motion may be improved by the bump injected into the physics model by predictor module 310 according to criteria and parameters for objects in rules table 321, and the criteria and parameters also contained there for use by interpolator module 320, further described in detail below in conjunction with FIGS. 4, 5A, and 5B.

Figure 4:
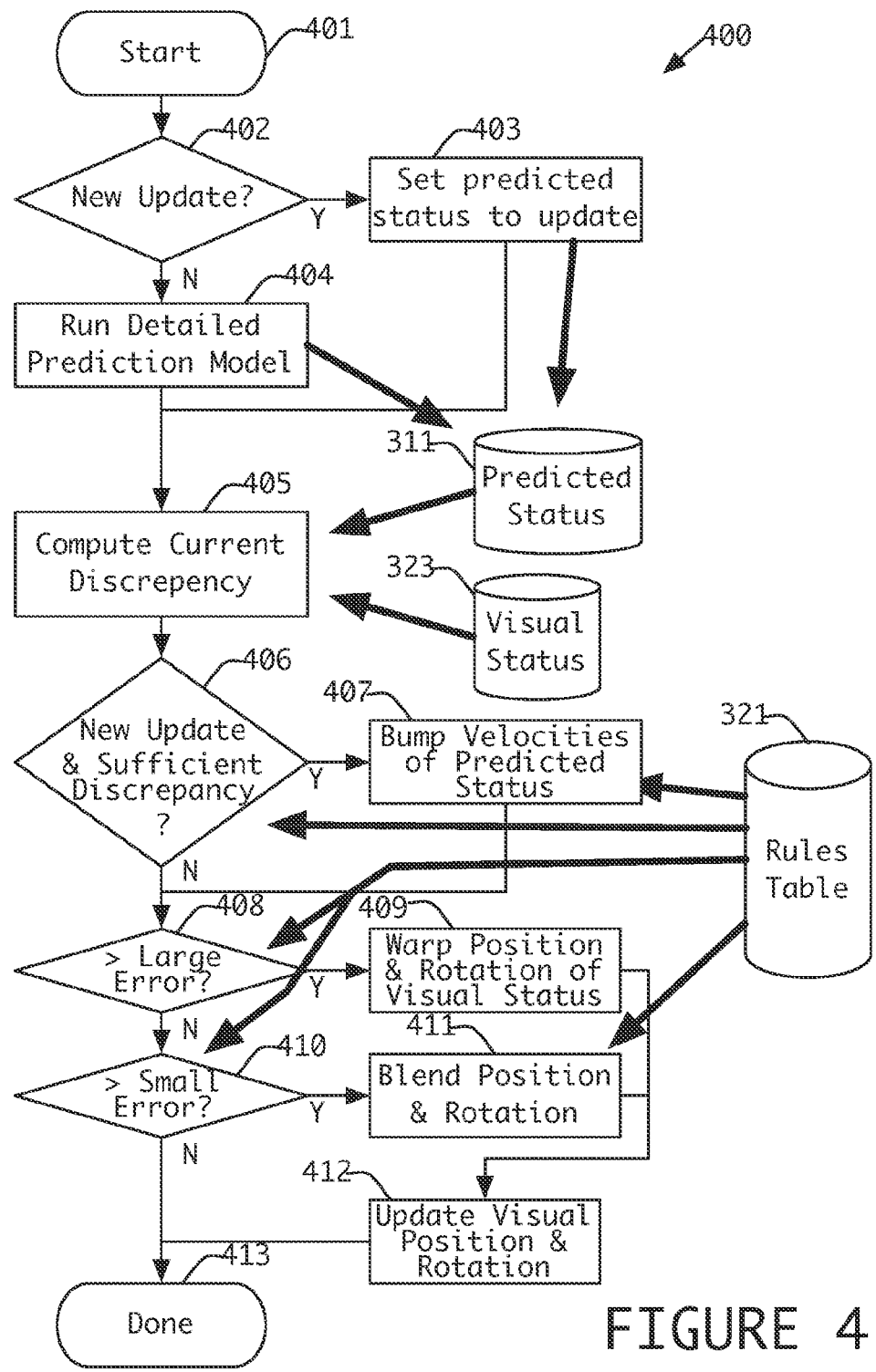
FIG. 4 is a flowchart for the remotely managed objection state interpolation process that may be performed by at least a portion of the system of FIG. 1.

FIG. 4 shows a process 400 that may be performed by remote model control module 230 (see FIGS. 2 and 3). At block 401, an iteration of the local simulation 200 begins in which dynamic object 203 is remotely managed by local model control module 270.

Next, at decision block 402, a determination is made as to whether a new update 1528 for dynamic object 203 has been received from local model control module 270. If the decision at decision block 402 is "YES," a new update 1528 for dynamic object 203 has been received and at block 403, the predicted status 311 is set equal to the status provided in the update. Then, remote model control module 230 advances to block 405. Otherwise, if the decision at decision block 402 is "NO," no new update 152B has been received, and at block 404, a detailed physics model is run for dynamic object 203 to provide a new value for the predicted status 311. Then, remote model control module 230 advances to block 405.

At block 405, the discrepancy between the new predicted status 311 and the current visual status 323 is computed.

In prior iterations of process 400, the local visual status 323 may have been set, but if uninitialized, may have been set with the current value of predicted status 311. Even if this was not done, the process 400 will quickly converge, by design, on an appropriate value for visual status 323.

Then, remote model control module 230 advances to decision block 406. The decision at decision block 406 is "YES," when there had been a new update 152B at block 402 and the discrepancy computed at block 405 exceeds one or more values indicated for the current mode of operation of dynamic object 203. When decision at decision block 406 is "YES," at block 407, an impulse or "velocity bump" (or "bump") is applied to the predicted status. This does not move the predicted "physics" representation of dynamic object 203, but alters the velocities in the representation so as to produce different outcomes in future iterations of the physics model at block 404. Then, remote model control module 230 advances to decision block 408.

When decision at decision block 406 is "NO," remote model control module 230 advances to decision block 408.

Whether or not a bump is applied at block 407, processing continues at decision block 408 where a check is made as to whether the discrepancy is greater than a predetermined "large" value from the portion of rules table 321 apropos to dynamic object 203 and its associated locally predicted status 311. A more detailed description of the check performed at decision block 408 is provided in FIGS. 5A and 5B, and the related discussion below. If the discrepancy is determined at decision block 408 to be "large," the decision at decision block 408 is "YES," and the process continues at block 409. On the other hand, if the decision at decision block 408 is "NO," the process continues at decision block 410.

At block 409, the new value for the visual status 323 is determined to be the current value of the predicted status 311, and the presentation of the object will "warp" (e.g., jump instantly) to the new position. Then, at block 412, this newly determined value is applied to visual status 323.

In some embodiments, at block 412, the updated visual status is further modified as the object model accommodates the new status, for example, the wheels of a vehicle may be adjusted by a terrain-following process to keep the wheels in apparent contact with the ground, or let the wheels seem to hang appropriately from the suspension when the vehicle "takes air" over a jump (i.e., when the position and orientation defined by new visual status places the wheel sufficiently high above the terrain).

Substantially coincident with the newly determined visual status 323 is the local collision status 322, at least at their hierarchical root. That is to say, the collision volume defined by the artist to detect impact with obstacles or projectiles has substantially the intended relationship with the visual model the artist provided for rendering the object. Typically, a collision volume is drastically simplified relative to the visual model provide for rendering module 350, to make calculations of object-to-terrain, object-to-object, and object-to-projectile interference substantially simpler, for example in projectile collision detect module 340.

In some embodiments, the local collision status 322 may be used by interpolator module 320, even iteratively, to adjust visual status at block 412, for example, to ensure that the object does not appear to interpenetrate the terrain.

Finally, the procedure for making these additional adjustments to visual status 323 and collision status 322 may vary with each kind or type of object, and is substantially an aesthetic modeling decision.

After the adjustments to visual status 323 are complete, process 400 ends with respect to dynamic object 203 at block 413.

However, if at decision block 408 the check finds that the discrepancy is not "large," (i.e., the decision at decision block 408 is "NO") at decision block 410, a check is made to determine whether the discrepancy is greater than a predetermined "small" value, where the appropriate "small" value is selected from rules table 321 by the predicted status 311 of dynamic object 203. Again, a more detailed description of the check performed at decision block 408 is provided in FIGS. 5A and 5B, and the related discussion below. If the discrepancy is greater than "small," the decision at decision block 410 is "YES" and at block 411 the new value for the visual status 323 is determined as a "blend" (or weighted average) of the current visual status 323 and the current predicted status, with the weighting and other constraints apropos to the predicted status of dynamic object 203 coming from rules table 321, with distinct values for comparison and manipulation of the position and rotation portions of visual status 323. Then, the new value for the visual status 323 is applied at block 412.

But, if the discrepancy does not exceed the check at decision block 410 for "small," the decision at decision block 410 is "NO," and no modification is made and the visual status 323 remains unchanged in this iteration. The test or check for a small discrepancy performed at decision block 410 promotes objects "coming to rest" visually. In this case, process 400 ends at block 413 for this iteration with respect to dynamic object 203.

In different embodiments, or even just for different types (or kinds) of objects, or for the same object but in different modes, the tests or checks performed at decision blocks 406, 408, and 410 with respect to the magnitude of the discrepancy determined at block 405 may use collective measures, or may analyze only certain portions of the discrepancy, as reflected in rules table 321. For example, linear measures of position are difficult to compare with measures of rotation (orientation). Thus, the position and rotation portions of the status are often compared separately, and in some embodiments, if either portion exceeds a corresponding predetermined value for each portion, then the entire discrepancy is determined to have exceeded. In some embodiments, or for some objects, further portions of position may be deemed important and given particular values in rules table 321. For example, for jumping bipeds (e.g., people, aliens, and the like), a tighter rein on discrepancy may be desired for their ground track, that is, their position in the x-y plane than on their altitude relative to it. For objects such as bipeds that can jump, a separate predetermined value can more stringently trigger from that portion of the discrepancy that is projected in the x-y plane, with an overall less-stringent (i.e., larger) predetermined value for the overall position portion of the discrepancy, that is, in xyz).

Figure 5A:
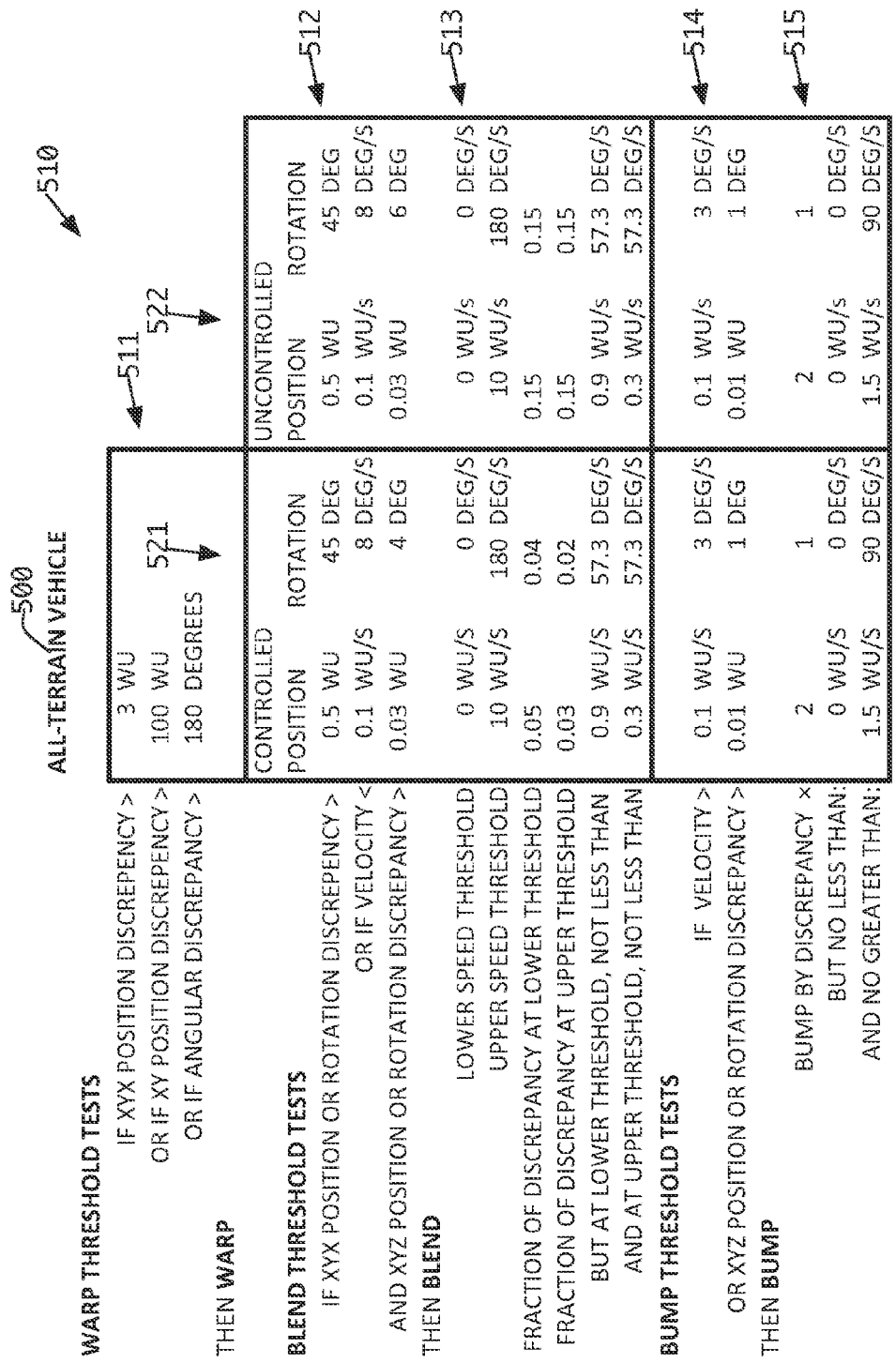
FIG. 5A is a table of criteria and parameters suitable for managing exemplary dynamic objects of a first exemplary type, namely an all-terrain vehicle type, operating in different modes and conditions.
Figure 5B:
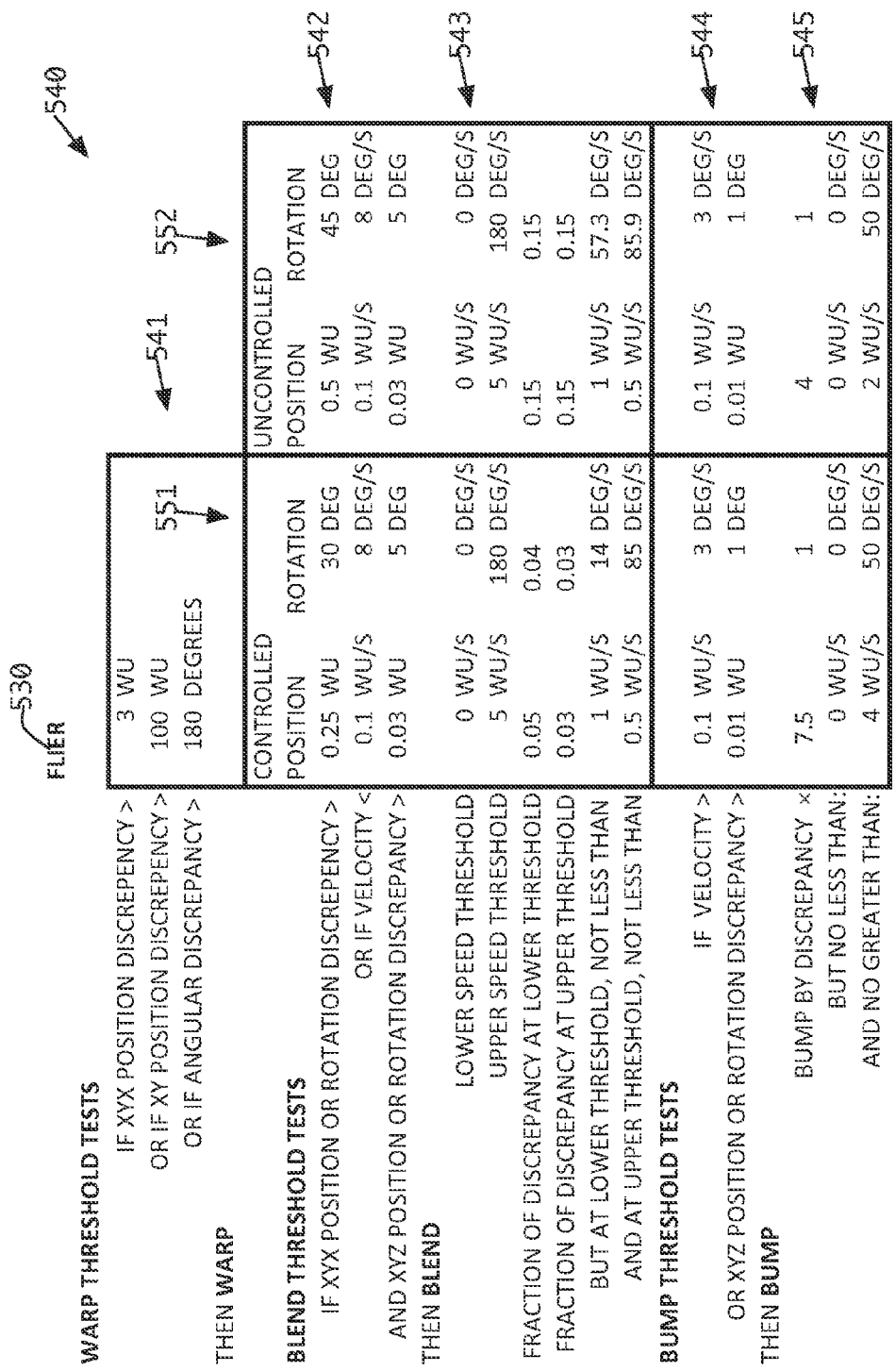
FIG. 5B is a table of criteria and parameters suitable for managing exemplary dynamic objects of an second exemplary type, namely a flier type, operating in different modes and conditions.

FIGS. 5A and 5B each provide an exemplary portion of rules table 321. FIG. 5A includes exemplary criteria and parameters for use with a first dynamic object type, namely a simulated all-terrain vehicle ("ATV") type object 500. FIG. 5B includes exemplary criteria and parameters for use with a second dynamic object type, namely a flier type object 530. The criteria and parameters provided in FIGS. 5A and 5B are for example implementations and not intended to be limiting. Further, rules table 321 may include portions for different and/or additional dynamic object types. Rules table 321 may be implemented as a single table or multiple tables.

Turning to FIG. 5A, in some embodiments, a portion 510 of rules table 321 is designated for a simulated all-terrain vehicle ("ATV") type object 500 object and contains a number of predetermined values corresponding to the tests or checks performed at decision blocks 406, 408, and 410, and parameters used for modifying the visual status 323 (e.g., blend) at block 411 and predicted status 311 at block 407, all appropriate for use by the remote model control module 230 in process 400 when processing an ATV type object, for example dynamic object 203.

Criteria 511 for the ATV type object 500 are used in decision block 408 (e.g., for dynamic object 203). The determination at decision block 408 as to whether the discrepancy from block 402 is more than "large" is broken into three comparisons. The first comparison is whether the xyz portion of the discrepancy is greater in magnitude than a value of three World Units ("WU") (in this example implementation, linear measurements are made in "World Units" that are analogous to meters or feet, but selected for convenient representation in the simulation, in these simulation examples one WU corresponds to approximately 2.5 m in the real world). The second comparison is whether the xy portion of the discrepancy is greater in magnitude than the value of 100 WU. Note that if the xy portion is greater than 100 WU, then certainly the xyz portion from the first comparison was greater than three. This comparison may function as a programmer's shorthand for disabling the xy comparison for the ATV type object 500. Had the xy discrepancy been functional for this type of object, the value used for the xy discrepancy would need to be less than that used for the xyz discrepancy. The third comparison is whether the angular portion of the discrepancy is greater than 180 degrees. If any of these three comparisons finds the corresponding portion of the discrepancy to exceed the value prescribed in criteria 511, the determination at decision block 408 is that the discrepancy exceeds the "large" value (or the decision at decision block 408 is "YES") and a warp will ensue at block 409.

Columns 521 and 522 of portion 510 of rules table 321 provide different predetermined values and parameters for use in cases where an object of type ATV (e.g., ATV type object 500) is controlled versus uncontrolled. Columns 521 provide predetermined values and parameters used when an object of type ATV is controlled and columns 522 provide predetermined values and parameters used when an object of type ATV is uncontrolled. In this embodiment, an object is "controlled" when a player's input (e.g., from game controller 143) is affecting the local model control module (e.g., local model control module 270) or, as previously discussed, if an AI or other operator process is affecting the model. In cases where being "controlled" or being "uncontrolled" matters, remote simulation updates (such as updates 152B) will indicate the mode of operation.

Criteria 512 for ATV type object 500 are used in the test or check performed at decision block 410 (e.g., for dynamic object 203). The determination at decision block 410 as to whether the discrepancy from block 402 is more than "small" is broken into two comparisons, with the values for the comparisons coming from columns 521 or 522, depending on the operational mode indicated in the most recent remote simulation update 1528. The first comparison is whether either the xyz portion or rotation (orientation) portion of the discrepancy is greater in magnitude than a value of 0.5 WU or 45 degrees, respectively. In this example, whether dynamic object 203 is "controlled" or "uncontrolled," does not matter because, the values are the same in both columns 521 and 522. Note that to be effective, the values (0.5 WU, 45 degrees) must each be smaller than the corresponding values (3 WU, 180 degrees) in criteria 511. The second comparison is a compound comparison that employs a tighter tolerance on the discrepancy (e.g., 0.03 WU, 4 degrees when in "controlled" mode, or 0.03 WU or 6 degrees when "uncontrolled") when the predicted status 311 of the object is moving sufficiently slowly (e.g., less than both 0.1 WU/s and 8 degrees/s). Thus, decision block 410 triggers a blend at block 411 if the discrepancy is too large, but that comparison can depend on speed. Objects moving more slowly can call for smaller discrepancies.

If a blend is required at block 411, it is performed with parameters and constraints apropos to dynamic object 203 from portion 513. A blend adds a fraction of the discrepancy from block 405 to the visual status 323 to obtain the new visual status at block 412, but what that fraction should be may have a significant aesthetic effect and may need to be adjusted under different circumstances. In this embodiment, for ATV type object 500, upper and lower speed thresholds are defined (which may vary by operational mode, but in this example, do not). For speeds at or below the lower speed threshold, the fractions apropos to position and rotation portions of the discrepancy added to the visual status 323 are given as the entries labeled "fraction of discrepancy at lower threshold." Similarly, for speeds at or above the upper speed threshold, the fractions are taken from entries labeled "fraction of discrepancy at upper threshold." For speeds between the upper and lower speed thresholds, the fraction can be interpolated from the upper and lower threshold fractions. For example, for dynamic object 203 in "controlled" mode predicted to have a velocity of 5 WU/s and a rotation of 0 degrees/second, the fraction of discrepancy for the blend of position may be calculated using the following formula:

(predicted speed−lower speed threshold)/(upper speed threshold−lower speed threshold)*(fraction at upper threshold−fraction at lower threshold)+ (fraction at lower threshold).

Using the above formula, the fraction of discrepancy for the blend of position in the above example is 0.4:

(5−0)/(10−0)*(0.03−0.05)+(0.05)=5/10*(−0.02)+ (0.05)=0.04.

A similar computation for the fraction to be applied when blending the rotation would use the values indicated for rotation, but in this case, since the rotation speed was at or below the lower speed threshold (0), the fraction of discrepancy at lower threshold given as 0.04 is used directly.

A final constraint on the blend is defined as a minimum rate of closure on the predicted status 311. Where, if the speed of the predicted status 311 is at or below the lower threshold, then a specific minimum rate of convergence of the current visual status 323 toward the predicted status 311 is required. Corresponding values are supplied for when the speed of the predicted status is at or above the upper threshold, and again, in a manner similar to that described above, for speeds between the upper and lower thresholds, the required minimum convergence rate parameters given in portion 513 may be interpolated.

Once the appropriate fractions have been determined, their application to the position and rotational of the visual status 323 is by means of Cartesian interpolation for the position portion and spherical linear interpolation (also known as "Slerp") for the rotation portion. The Slerp implementation may use a quaternion representation for the rotation, but this is not strictly required.

Criteria 514 for ATV type object 500 are used in decision block 406 (e.g., for dynamic object 203). The determination at decision block 406 as to whether there had been a new update used at block 402, and whether the discrepancy from block 405 is "sufficient" to warrant a bump, is a compound comparison, with the values for the comparison coming from columns 521 or 522, depending on the operational mode indicated in the most recent remote simulation update 152B. In this embodiment, as with the compound comparison discussed above, a test is performed to see whether the object's predicted status 311 is either moving faster than a threshold (in portion 514, labeled "if velocity>") or whether the discrepancy (labeled "or xyz position or rotation discrepancy") is sufficiently large. If any of the comparisons at decision block 406 finds the corresponding parameter to be exceeded, then decision block 406 determines that the discrepancy is indeed "sufficient" and a bump is performed at block 407.

The parameters for the bump are given in portion 515. In this embodiment, the bump is the discrepancy multiplied by a scale factor (labeled "BUMP by discrepancy x") effectively having units of reciprocal seconds, since the value of the bump is a velocity that is added to the predicted status 311 at block 407. Once a value for the bump has been determined in this way, it is further subjected to the limits labeled "but no less than" and "no greater than," within the parameters of portion 515, allowing the designer to constrain the effect of a bump. Generally speaking, the effects of a bump may be visually inappropriate if the bump is allowed to be large. However, when the bump is naturally small, or otherwise restrained, the result is a substantial improvement in aesthetic behavior of objects controlled by remote model control module 230.

By way of further example, FIG. 5B shows a portion 540 of rules table 321, corresponding to a flier type object 530, a type of object not shown in the local simulations 200 and 250 illustrated in FIG. 2. Returning to FIG. 5B, in portion 540, columns 551 and 552 each include columns corresponding to the same modes of control as columns included in columns 521 and 522, respectively, of FIG. 5A. Criteria 541, 542, and 544 are used in the same way as criteria 511, 512 and 514, respectively. Parameters in portions 543 and 545 are used in the same manner as parameters in portions 513 and 515, respectively. The differences in the criteria and parameters provided in rules table 321 may be set empirically, e.g., by a designer. Each of the criteria determines which conditions will cause certain elements of process 400 to apply, and each parameter can affect the visual outcome.

Computing Devices

Figure 6:
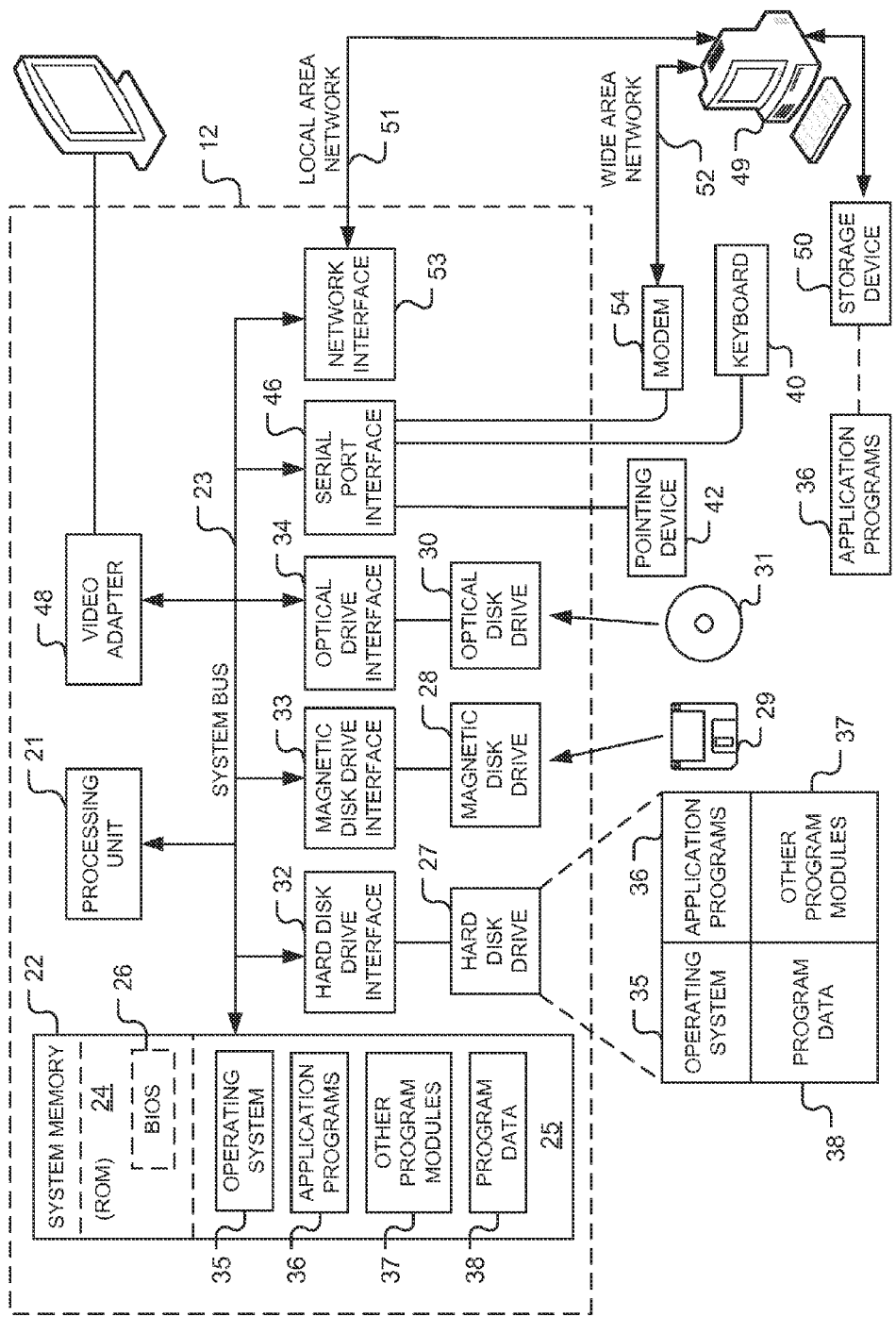
FIG. 6 is a diagram of a hardware environment and an operating environment in which one or more of gaming consoles of the system of FIG. 1 may be implemented.

FIG. 6 is a diagram of hardware and an operating environment in conjunction with which implementations of one or more of the game consoles 111, 142, 144, 146 may be practiced. The description of FIG. 6 is intended to provide a brief, general description of suitable computer hardware and a suitable computing environment in which implementations may be practiced. Although not required, implementations are described in the general context of computer-executable instructions, such as program modules, executed by a processor. Generally, program modules include routines, programs, objects, components, data structures, etc., that perform particular tasks or implement particular abstract data types.

Moreover, those skilled in the art will appreciate that implementations may be practiced with other computer system configurations, including hand-held devices, multiprocessor systems, microprocessor-based or programmable consumer electronics, network PCs, minicomputers, mainframe computers, and the like. Implementations may also be practiced in distributed computing environments where tasks are performed by remote processing devices that are linked through a communications network. In a distributed computing environment, program modules may be located in both local and remote memory storage devices.

The exemplary hardware and operating environment of FIG. 6 includes a general-purpose computing device in the form of a computing device 12. The computing device 12 may be a conventional game console, cellular telephone, tablet computer, conventional computer, a distributed computer, or any other type of computer. The game consoles 111, 142, 144, 146 may each be substantially identical to the computing device 12. However, this is not a requirement.

The computing device 12 includes a system memory 22, the processing unit 21, and a system bus 23 that operatively couples various system components, including the system memory 22, to the processing unit 21. There may be only one or there may be more than one processing unit 21, such that the processor of computing device 12 includes a single central-processing unit ("CPU"), or a plurality of processing units, commonly referred to as a parallel processing environment. When multiple processing units are used, the processing units may be heterogeneous. By way of a non-limiting example, such a heterogeneous processing environment may include a conventional CPU, a conventional graphics processing unit ("GPU"), a floating-point unit ("FPU"), combinations thereof, and the like.

The system bus 23 may be any of several types of bus structures including a memory bus or memory controller, a peripheral bus, and a local bus using any of a variety of bus architectures. The system memory 22 may also be referred to as simply the memory, and includes read only memory (ROM) 24 and random access memory (RAM) 25. A basic input/output system (BIOS) 26, containing the basic routines that help to transfer information between elements within the computing device 12, such as during start-up, is stored in ROM 24. The computing device 12 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules, and other data for the computing device 12. It should be appreciated by those skilled in the art that any type of computer-readable media which can store data that is accessible by a computer, such as magnetic cassettes, flash memory cards, solid state memory devices ("SSD"), USB drives, digital video disks, Bernoulli cartridges, random access memories (RAMs), read only memories (ROMs), and the like, may be used in the exemplary operating environment. As is apparent to those of ordinary skill in the art, the hard disk drive 27 and other forms of computer-readable media (e.g., the removable magnetic disk 29, the removable optical disk 31, flash memory cards, SSD, USB drives, and the like) accessible by the processing unit 21 may be considered components of the system memory 22.

A number of program modules may be stored on the hard disk drive 27, magnetic disk 29, optical disk 31, ROM 24, or RAM 25, including an operating system 35, one or more application programs 36, other program modules 37, and program data 38. A user may enter commands and information into the computing device 12 through input devices such as a keyboard 40 and pointing device 42. Referring to FIG. 1, input devices include controllers 113, 143, 145, 147. Non-limiting examples of input devices include a microphone, joystick, game pad, satellite dish, scanner, touch sensitive devices (e.g., a stylus, touch pad, touch screen, and the like), video camera, depth camera, or the like. These and other input devices are often connected to the processing unit 21 through a serial port interface 46 that is coupled to the system bus 23, but may be connected by other interfaces, such as a parallel port, game port, a universal serial bus (USB), or a wireless interface (e.g., a Bluetooth interface).

A monitor 47 or other type of display device (e.g., display 112 illustrated in FIG. 1) may also connected to the system bus 23 via an interface, such as a video adapter 48. The display 112 may be implemented as a television, display screen, touch screen, and the like. In addition to the monitor 47, computers typically include other peripheral output devices (not shown), such as speakers, printers, and haptic devices that provide tactile and/or other types of physical feedback (e.g., a force feed back game controller).

The input devices described above are operable to receive user input and selections. Together the input and display devices may be described as providing a user interface.

The computing device 12 may operate in a networked environment using logical connections to one or more remote computers, such as remote computer 49. As explained above, two or more of game consoles 111, 142, 144, 146 may be selectively connected to one another over network 120. These logical connections are achieved by a communication device coupled to or a part of the computing device 12 (as the local computer). Implementations are not limited to a particular type of communications device. The remote computer 49 may be another computer, a server, a router, a network PC, a client, a memory storage device, a peer device or other common network node, and typically includes many or all of the elements described above relative to the computing device 12. The remote computer 49 may be connected to a memory storage device 50. The logical connections depicted in FIG. 6 include a local-area network (LAN) 51 and a wide-area network (WAN) 52. Such networking environments are commonplace in offices, enterprise-wide computer networks, intranets, and the Internet.

Those of ordinary skill in the art will appreciate that a LAN may be connected to a WAN via a modem using a carrier signal over a telephone network, cable network, cellular network, or power lines. Such a modem may be connected to the computing device 12 by a network interface (e.g., a serial or other type of port). Further, many laptop computers may connect to a network via a cellular data modem.

When used in a LAN-networking environment, the computing device 12 is connected to the local area network 51 through a network interface or adapter 53, which is one type of communications device. When used in a WAN-networking environment, the computing device 12 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computing device 12, or portions thereof, may be stored in the remote computer 49 and/or the remote memory storage device 50. It is appreciated that the network connections shown are exemplary and other means of and communications devices for establishing a communications link between the computers may be used.

The computing device 12 and related components have been presented herein by way of particular example and also by abstraction in order to facilitate a high-level view of the concepts disclosed. The actual technical design and implementation may vary based on particular implementation while maintaining the overall nature of the concepts disclosed.

In some embodiments, the system memory 22 stores computer executable instructions that when executed by one or more processors cause the one or more processors to perform all or portions of process 400. Such instructions may be stored on one or more non-transitory computer-readable media.

As with all such systems, the particular features of the system, specifics of the user interfaces, and the performance of the processes, may depend, for example, on the architecture used to implement the system, the operating system of the servers selected, the bandwidth and other properties of the network selected, and the software code written. Various additional modifications of the described embodiments specifically illustrated and described herein will be apparent to those of ordinary skill in the art, in light of the present teachings.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A method for substantially contemporaneously presenting a distributed simulation at a plurality of computing devices, the plurality of computing devices comprising a first computing device executing a first portion of the distributed simulation, the first portion controlling an object, the method comprising:
   a) executing, on a second of the plurality of computing devices, a second portion of the distributed simulation, the second portion generating a first visual representation of the object displayable on a first display device, the second computing device comprising a visual status associated with the object and the first visual representation, the visual status comprising at least one parameter value, the second computing device having received a previous update from the first computing device comprising a previous status associated with a second visual representation of the object;
   b) generating, at the second computing device, a predicted status of the object based at least in part on the previous status, the predicted status comprising at least one velocity and at least one parameter value;
   c) receiving, at the second computing device, an update from the first computing device, the update comprising a new status associated with a third visual representation of the object, the new status comprising at least one parameter value;
   d) setting, at the second computing device, the at least one parameter value of the predicted status equal to the at least one parameter value of the new status;
   e) determining, by the second computing device, a discrepancy between the at least one parameter value of the predicted status and the at least one parameter value of the visual status;
   f) when the discrepancy is greater than a first threshold value, modifying, by the second computing device, the at least one velocity of the predicted status;
   g) when the discrepancy is greater than a second threshold value, modifying, by the second computing device, at least one parameter value of the visual status based at least in part on the at least one parameter value of the predicted status;
   h) rendering, by the second computing device, a fourth visual representation of the object based at least in part on the visual status; and
   i) displaying, by the second computing device, the fourth visual representation of the object on the first display device.

2. The method of claim 1, wherein the predicted status is a first predicted status, the discrepancy is a first discrepancy, and the method further comprises:
   generating, by the second computing device, a second predicted status based at least in part on the at least one velocity of the predicted status, the second predicted status comprising at least one parameter value;
   when the second discrepancy is greater than the second threshold value, modifying, by the second computing device, the at least one parameter value of the visual status based at least in part on the at least one parameter value of the second predicted status;
   rendering, by the second computing device, a fifth visual representation of the object based at least in part on the visual status; and
   displaying, by the second computing device, the fifth visual representation of the object on the first display device.

3. The method of claim 1 for use with the third visual representation of the object being displayed by the first computing device on a second display device, wherein the fourth visual representation of the object is displayed by the second computing device on the first display device substantially contemporaneously with the third visual representation of the object displayed by the first computing device on the second display device.

4. The method of claim 1, further comprising:
   obtaining, by the second computing device, the first threshold value from a storage device accessible by the second computing device.

5. The method of claim 4, wherein the object has a type, and the first threshold value is stored in a table stored on the storage device, the first threshold value being associated with the type of the object in the table.

6. The method of claim 1, wherein the object has a type, the at least one parameter value of the new status comprises at least one velocity, and
   modifying, by the second computing device, the at least one velocity of the predicted status comprises obtaining a bump value associated with the type of the object, and calculating the at least one velocity of the predicted status as a function of the bump value, the discrepancy, and the at least one velocity of the new status.

7. The method of claim 1, wherein the at least one parameter value of the visual status comprises at least one velocity, the at least one parameter value of the predicted status comprises at least one velocity, and
   determining the discrepancy between the at least one parameter value of the predicted status and the at least one parameter value of the visual status comprises determining a discrepancy between the at least one velocity of the predicted status and the at least one velocity of the visual status.

8. The method of claim 7, wherein the at least one parameter value of the new status comprises at least one velocity, and
 the at least one velocity of the predicted status is set equal to the at least one velocity of the new status.

9. The method of claim 1, wherein the at least one parameter value of the visual status comprises at least one of position information and orientation information;
 the at least one parameter value of the predicted status comprises at least one of position information and orientation information; and
 determining the discrepancy between the at least one parameter value of the predicted status and the at least one parameter value of the visual status comprises determining a discrepancy between the at least one of position information and orientation information of the predicted status and the at least one of position information and orientation information of the visual status.

10. The method of claim 9, wherein the at least one parameter value of the new status comprises at least one of position information and orientation information, and
 the at least one of position information and orientation information of the predicted status is set equal to the at least one of position information and orientation information of the new status.

11. The method of claim 9, wherein modifying the at least one parameter value of the visual status based at least in part on the at least one parameter value of the predicted status when the discrepancy is greater than a second threshold value, further comprises:
 determining whether the discrepancy is greater than a third threshold value, the third threshold value being larger than the second threshold value; and
 when it is determined that the discrepancy is greater than the third threshold value, setting the at least one of position information and orientation information of the visual status equal to the at least one of position information and orientation information of the predicted status.

12. The method of claim 11, wherein the object has a type, the third threshold value is stored in a table and associated with the object type in the table, and
 the method further comprises obtaining, by the second computing device, the third threshold value from the table.

13. The method of claim 11, wherein modifying the at least one parameter value of the visual status based at least in part on the at least one parameter value of the predicted status when the discrepancy is greater than the second threshold value, further comprises:
 determining, by the second computing device, a blended status when the discrepancy is less than the third threshold value, the blended status being based at least in part on the at least one of position information and orientation information of the visual status and the at least one of position information and orientation information of the predicted status, the blended status comprising at least one of position information and orientation information, and
 setting the at least one of position information and orientation information of the visual status equal to the at least one of position information and orientation information of the blended status.

14. The method of claim 13, wherein the object has a type, and
 the blend status is determined at least in part based upon one or more parameter values associated with the type of the object.

15. The method of claim 11, wherein the object has a type, the second and third threshold values are stored in a table and associated with the object type in the table, and
 the method further comprises obtaining, by the second computing device, the second and third threshold values from the table.

16. The method of claim 9, wherein modifying the at least one parameter value of the visual status based at least in part on the at least one parameter value of the predicted status when the discrepancy is greater than the second threshold value, further comprises:
 determining, by the second computing device, a blended status when the discrepancy is less than a third threshold value, the blended status being based at least in part on the at least one of position information and orientation information of the visual status and the at least one of position information and orientation information of the predicted status, the blended status comprising at least one of position information and orientation information, and
 setting the at least one of position information and orientation information of the new visual status equal to the at least one of position information and orientation information of the blended status.

17. The method of claim 1, wherein modifying the at least one parameter value of the visual status based at least in part on the at least one parameter value of the predicted status when the discrepancy is greater than the second threshold value, further comprises:
 determining whether the discrepancy is greater than a third threshold value, the third threshold value being larger than the second threshold value; and
 when it is determined that the discrepancy is greater than the third threshold value, setting the at least one parameter value of the visual status equal to the at least one parameter value of the predicted status.

18. The method of claim 17, wherein modifying the at least one parameter value of the visual status based at least in part on the at least one parameter value of the predicted status when the discrepancy is greater than the second threshold value, further comprises:
 determining, by the second computing device, a blended status when the discrepancy is less than the third threshold value, the blended status being based at least in part on the at least one parameter value of the visual status and the at least one parameter value of the predicted status, the blended status comprising at least one parameter value, and
 setting the at least one parameter value of the visual status equal to the at least one parameter value of the blended status.

19. The method of claim 18, wherein the at least one parameter value of the new status comprises a mode of control of the object, and the method further comprises:
 selecting at least one of the second and third threshold values from a plurality of first and second threshold values based at least in part on the mode of control of the object.

20. The method of claim 18, wherein the object has a type, and
 selecting the at least one of the second and third threshold values from the plurality of first and second threshold values based at least in part on the mode of control of the object further comprises selecting at least one of the second and third threshold values from the plurality of first and second threshold values based at least in part on the type of the object.

21. The method of claim 1, wherein modifying the at least one parameter value of the visual status based at least in part on the at least one parameter value of the predicted status when the discrepancy is greater than the second threshold value further comprises:
   determining, at the second computing device, a local collision status; and
   modifying, at the second computing device, the visual status based on the local collision status.

22. The method of claim 21 for use with the distributed simulation comprising terrain, the method further comprising:
   repeating determining the local collision status and modifying the visual status based on the local collision status until the object does not substantially interpenetrate the terrain.

23. A method for use with a plurality of computing devices connected to one another over a network and each executing a portion of a distributed simulation comprising a plurality of objects, the portion executing on a first of the plurality of computing devices controlling a portion of the plurality of objects and sending updates related to at least one object of the portion of the plurality of objects to a second of the plurality of computing devices, the method comprising:
   a) at the second computing device, receiving from the first computing device a previous update comprising status information related to a first object of the portion of the plurality of objects controlled by the first computing device;
   b) at the second computing device, generating and displaying a first visual representation of the first object based at least in part on the status information related to the first object, the second computing device comprising visual status information associated with the first object and the first visual representation;
   c) at the second computing device, receiving a new update comprising status information from the first computing device, the new update having been received after the previous update;
   d) at the second computing device, determining predicted status information for the first object based at least in part on the status information of the previous update, the predicted status information comprising at least one velocity value;
   e) determining whether the status information of the new update is related to the first object;
   f) when the second computing device determines the status information of the new update is related to the first object, setting at least a portion of the predicted status information equal to at least a portion of the status information of the new update;
   g) determining a discrepancy between the visual status information and the predicted status information;
   h) when the discrepancy is greater than a first threshold value, modifying the at least one velocity value of the predicted status information;
   i) when the discrepancy is greater than a second threshold value, modifying the visual status information based at least in part on the predicted status information;
   j) rendering, by the second computing device, a second visual representation of the object based at least in part on the visual status information; and
   k) displaying, by the second computing device, the second visual representation of the object on the display device.

24. The method of claim 23, wherein the predicted status information is a first predicted status information, the discrepancy is a first discrepancy, and the method further comprises:
   generating, by the second computing device, second predicted status information based at least in part on the at least one velocity of the first predicted status information;
   determining a second discrepancy between the visual status information and the second predicted status information;
   when the second discrepancy is greater than the second threshold value, modifying the visual status information based at least in part on the second predicted status information;
   rendering, by the second computing device, a third visual representation of the object based at least in part on the visual status information; and
   displaying, by the second computing device, the third visual representation of the object on the display device.

25. The method of claim 23, for use with the portion of the distributed simulation executing on the second computing device and controlling a second portion of the plurality of objects, the method further comprising:
   sending updates related to at least one object of the second portion of the plurality of objects to the first computing device.

26. The method of claim 23, for use with the portion of the distributed simulation executing on the second computing device controlling a second portion of the plurality of objects, the method further comprising:
   receiving user input via a user interface device, the user input changing a status of a selected object of the second portion of the plurality of objects;
   creating an update comprising status information related to the selected object; and
   sending the update related to the selected object to the first computing device.

27. The method of claim 23, for use with a server connected to the plurality of computing devices over the network, and the portion of the distributed simulation executing on the second computing device controlling a second portion of the plurality of objects, the method further comprising:
   sending updates related to at least one object of the second portion of the plurality of objects to the server for forwarding thereby to others of the plurality of computing devices.

28. A method for use with a plurality of computing devices each executing a portion of a distributed simulation comprising a plurality of objects, the portion executing on a first of the plurality of computing devices controlling a portion of the plurality of objects and sending updates related to at least one object of the portion of the plurality of objects to at least a second of the plurality of computing devices, the method comprising:
   a) at the second computing device, receiving from the first computing device a previous update comprising status information related to a first object of the portion of the plurality of objects controlled by the first computing device;
   b) at the second computing device, generating and displaying a first visual representation of the first object based at least in part on the status information related to the first object, the second computing device comprising visual status information associated with the first object and the first visual representation;

c) at the second computing device, receiving a new update comprising status information from the first computing device, the new update having been received after the previous update;
d) at the second computing device, determining predicted status information for the first object based at least in part on the status information of the previous update;
e) at the second computing device, determining whether the status information of the new update is related to the first object;
f) when the second computing device determines the status information of the new update is related to the first object, at the second computing device, setting at least a portion of the predicted status information equal to at least a portion of the status information of the new update;
g) at the second computing device, determining a discrepancy between the visual status information and the predicted status information;
h) when the discrepancy is greater than a first threshold value, at the second computing device, setting at least a portion of the visual status information equal to at least a portion of the predicted status information;
i) when the discrepancy is less than the first threshold value and greater than a second threshold value, determining, by the second computing device, blended status information based at least in part on the visual status information and the predicted status information, and setting at least a portion of the visual status information equal to at least a portion of the blended status information, the first threshold value being greater than the second threshold value;
j) rendering, by the second computing device, a second visual representation of the first object based at least in part on the visual status information; and
k) at the second computing device, displaying the second visual representation of the first object on the display device.

29. A method for use with a plurality of computing devices connected to one another over a network and each executing a portion of a distributed simulation comprising a plurality of objects, the portion executing on a first of the plurality of computing devices controlling a first portion of the plurality of objects and sending updates related to at least one object of the first portion of the plurality of objects to a second of the plurality of computing devices, the portion executing on the second computing device controlling a second portion of the plurality of objects and sending updates related to at least one object of the second portion of the plurality of objects to the first computing device, the method comprising:
at the second computing device, rendering a first visual representation of a first object of the first portion of the plurality of objects, and a first visual representation of a second object of the second portion of the plurality of objects, the first visual representation of the first object being associated with visual status information;
at the second computing device, receiving input, via a user input device, changing the first visual representation of the second object, and occasionally receiving updates from the first computing device usable by the second computing device to modify the first visual representation of the first object, each of the updates received from the first computing device comprising status information related to the first object;
as the first visual representation of the second object changes, at the second computing device, occasionally sending updates to the first computing device over the network, the updates comprising status information related to the second object usable by the first computing device to modify a second visual representation of the second object;
at the second computing device, occasionally generating predicted status information for the first object comprising at least one velocity;
after each of the updates is received at the second computing device, setting the predicted status information equal to the status information of the update;
at the second computing device, determining a discrepancy between the predicted status information and the visual status information associated with the first visual representation of the first object;
at the second computing device, when the discrepancy is larger than a first threshold value, updating the predicted status information by changing the at least one velocity;
at the second computing device, when the discrepancy is larger than a second threshold value, modifying the visual status information associated with the first visual representation of the first object based at least in part on the predicted status information; and
at the second computing device, re-rendering the first visual representation of the second object based at least in part on the visual status information.

30. The method of claim 29, wherein the first object has a type, the first and second threshold values are stored in a table and associated with the type of the object in the table, and the method further comprises:
at the second computing device, looking up the first and second threshold values in the table.

31. The method of claim 29, wherein modifying the visual status information associated with the first visual representation of the first object based at least in part on the predicted status information when the discrepancy is larger than the second threshold value comprises:
when the discrepancy is greater than a third threshold value, setting the visual status information equal to the predicted status information; and
when the discrepancy is less than the third threshold value and greater than the second threshold value, determining, by the second computing device, blended status information based at least in part on the visual status information and the predicted status information, and setting the visual status information equal to the blended status information, the third threshold value being greater than the second threshold value.

32. One or more non-transitory computer readable media storing computer executable instructions that when executed by one or more processors perform a method for use with a first computing device executing a first portion of a distributed simulation, the first portion controlling an object, the method comprising:
executing a second portion of the distributed simulation, the second portion generating a first visual representation of the object displayable on a first display device, a visual status being associated with the object and the first visual representation, the visual status comprising at least one parameter value;
b) generating a predicted status of the object based at least in part on a previous status of a previous update received from the first computing device, the previous status being associated with a second visual representation of the object, the predicted status comprising at least one velocity and at least one parameter value;
c) receiving an update from the first computing device, the update comprising a new status associated with a third visual representation of the object, the new status comprising at least one parameter value;
d) setting the at least one parameter value of the predicted status equal to the at least one parameter value of the new status;
e) determining a discrepancy between the at least one parameter value of the predicted status and the at least one parameter value of the visual status;
f) when the discrepancy is greater than a first threshold value, modifying the at least one velocity of the predicted status;
g) when the discrepancy is greater than a second threshold value, modifying at least one parameter value of the visual status based at least in part on the at least one parameter value of the predicted status;
h) rendering a fourth visual representation of the object based at least in part on the visual status; and
i) displaying the fourth visual representation of the object on the first display device.

33. The one or more non-transitory computer readable media of claim 32, wherein the predicted status is a first predicted status, the discrepancy is a first discrepancy, and the method further comprises:
generating a second predicted status based at least in part on the at least one velocity of the predicted status, the second predicted status comprising at least one parameter value;
when the second discrepancy is greater than a second threshold value, modifying the at least one parameter value of the visual status based at least in part on the at least one parameter value of the second predicted status;
rendering a fifth visual representation of the object based at least in part on the visual status; and
displaying the fifth visual representation of the object on the first display device.

34. The one or more non-transitory computer readable media of claim 32, wherein modifying the at least one parameter value of the visual status based at least in part on the at least one parameter value of the predicted status when the discrepancy is greater than the second threshold value, further comprises:
determining whether the discrepancy is greater than a third threshold value, the third threshold value being larger than the second threshold value; and
when it is determined that the discrepancy is greater than the third threshold value, setting the at least one of parameter value of the visual status equal to the at least one of parameter value of the predicted status; and
when it is determined that the discrepancy is less than the third threshold value, determining a blended status based at least in part on the at least one parameter value of the visual status and the at least one parameter value of the predicted status, the blended status comprising at least one parameter value, and setting the at least one parameter value of the visual status equal to the at least one of parameter value of the blended status.

35. A system for implementing a distributed simulation comprising a plurality of objects, the system comprising:
a plurality of computing devices connected to one another over a network, each computing device being configured to execute a portion of the distributed simulation,
a first computing device of the plurality of computing devices executing a first portion of the distributed simulation that controls a portion of the plurality of objects and sends updates related to at least one object of the portion of the plurality of objects to a second of the plurality of computing devices, the second computing device being configured to:
receive from the first computing device a previous update comprising status information related to a first object of the portion of the plurality of objects controlled by the first computing device;
generate a first visual representation of the first object based at least in part on the status information related to the first object,
display the first visual representation on a display device, the second computing device comprising visual status information associated with the first object and the first visual representation;
receive a new update comprising status information from the first computing device, the new update having been received after the previous update;
determining predicted status information for the first object based at least in part on the status information of the previous update, the predicted status information comprising at least one velocity value;
determine whether the status information of the new update is related to the first object;
when the second computing device determines the status information of the new update is related to the first object, set at least a portion of the predicted status information equal to at least a portion of the status information of the new update;
determine a discrepancy between the visual status information and the predicted status information;
when the discrepancy is greater than a first threshold value, modify the at least one velocity value of the predicted status information;
when the discrepancy is greater than the second threshold value, modify the visual status information based at least in part on the predicted status information;
render a second visual representation of the object based at least in part on the visual status information; and
display the second visual representation of the object on the display device.

36. The system of claim 35, wherein the predicted status information is a first predicted status information, the discrepancy is a first discrepancy, and the second computing device is further configured to:
generate second predicted status information based at least in part on the at least one velocity of the first predicted status information;
determine a second discrepancy between the visual status information and the second predicted status information;
when the second discrepancy is greater than the second threshold value, modify the visual status information based at least in part on the second predicted status information;
render a third visual representation of the object based at least in part on the visual status information; and
display the third visual representation of the object on the display device.

37. The system of claim 35, wherein the portion of the distributed simulation executing on the second computing device controls a second portion of the plurality of objects, and the second computing device is further configured to send updates related to at least one object of the second portion of the plurality of objects to the first computing device.

38. The system of claim 35, wherein the portion of the distributed simulation executing on the second computing device controls a second portion of the plurality of objects, and the second computing device is further configured to:

receive user input via a user interface device, the user input changing a status of a selected object of the second portion of the plurality of objects;

create an update comprising status information related to the selected object; and send the update related to the selected object to the first computing device.

39. The system of claim 35, further comprising:

a server connected to the plurality of computing devices over the network, wherein the portion of the distributed simulation executing on the second computing device controls a second portion of the plurality of objects, the second computing device is further configured to send updates related to at least one object of the second portion of the plurality of objects to the server for forwarding thereby to others of the plurality of computing devices.

* * * * *